United States Patent
Kimura

(10) Patent No.: US 9,807,781 B2
(45) Date of Patent: Oct. 31, 2017

(54) BASE STATION AND SCHEDULING METHOD

(71) Applicant: FUJITSU LIMITED, Kawasaki-shi, Kanagawa (JP)

(72) Inventor: Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 15/019,292

(22) Filed: Feb. 9, 2016

(65) Prior Publication Data

US 2016/0157257 A1 Jun. 2, 2016

Related U.S. Application Data

(63) Continuation of application No. PCT/JP2013/072896, filed on Aug. 27, 2013.

(51) Int. Cl.
*H04W 72/08* (2009.01)
*H04W 72/12* (2009.01)
(Continued)

(52) U.S. Cl.
CPC ....... *H04W 72/1205* (2013.01); *H04W 16/02* (2013.01); *H04W 16/32* (2013.01);
(Continued)

(58) Field of Classification Search
CPC ......... H04W 72/1205; H04W 72/0453; H04W 72/0426; H04W 72/1226; H04W 16/02; H04W 16/32; H04W 84/045
See application file for complete search history.

(56) References Cited

U.S. PATENT DOCUMENTS 8,953,475 B2 * 2/2015 Li .................. H04J 11/0023
370/252
2009/0221295 A1 9/2009 Sahin et al.
(Continued)

FOREIGN PATENT DOCUMENTS

JP 2011-091783 A 5/2011
JP 2011-515916 A 5/2011
(Continued)

OTHER PUBLICATIONS

International Search Report, dated Oct. 15, 2013 in connection with PCT/JP2013/072896 (7 pages).

*Primary Examiner* — Ricky Ngo
*Assistant Examiner* — Lan Huong Truong
(74) *Attorney, Agent, or Firm* — Fujitsu Patent Center

(57) ABSTRACT

A base station serves as a second base station in a communication system including a first base station corresponding to a first cell and the second base station corresponding to a second cell smaller than a first area of the first cell. At least part of the second cell overlaps the first area. The base station includes: a calculation unit that, based on a first channel estimation value between a first terminal connected to the first base station through the first cell and the second base station as well as a second channel estimation value between a second terminal connected to the second base station through the second cell and the second base station, calculates an indicator based on a phase relationship between the first channel estimation value and the second channel estimation value; and a scheduler that determines whether to include a first candidate in a second candidate.

6 Claims, 7 Drawing Sheets

|  | ASSIGNED RESOURCE FOR INTERFERING USER | OTHER THAN ASSIGNED RESOURCE FOR INTERFERING USER |
|---|---|---|
| HIGH ORTHOGONALITY (LOW CORRELATION) | AVAILABLE FOR ASSIGNMENT (USING IRC) | AVAILABLE FOR ASSIGNMENT |
| LOW ORTHOGONALITY (HIGH CORRELATION) | UNAVAILABLE FOR ASSIGNMENT | AVAILABLE FOR ASSIGNMENT |

(51) Int. Cl.
*H04W 16/02* (2009.01)
*H04W 16/32* (2009.01)
*H04W 72/04* (2009.01)
*H04W 84/04* (2009.01)

(52) U.S. Cl.
CPC ... *H04W 72/0426* (2013.01); *H04W 72/0453* (2013.01); *H04W 72/1226* (2013.01); *H04W 84/045* (2013.01)

(56) References Cited

U.S. PATENT DOCUMENTS

| | | |
|---|---|---|
| 2010/0056167 A1 | 3/2010 | Guvenc |
| 2010/0142466 A1 | 6/2010 | Palanki et al. |
| 2011/0143766 A1* | 6/2011 | Sun ............... H04L 1/0025 455/452.2 |
| 2012/0170508 A1 | 7/2012 | Sawai |
| 2013/0163462 A1 | 6/2013 | Ohwatari et al. |
| 2013/0294271 A1 | 11/2013 | Nagata et al. |
| 2013/0329596 A1 | 12/2013 | Shirakabe et al. |
| 2014/0126510 A1 | 5/2014 | Ogawa et al. |

FOREIGN PATENT DOCUMENTS

| | | |
|---|---|---|
| JP | 2012-511295 A | 5/2012 |
| JP | 2012-231217 A | 11/2012 |
| WO | 2010068628 A1 | 6/2010 |
| WO | 2010077690 A1 | 7/2010 |
| WO | 2012063781 A1 | 5/2012 |
| WO | 2013005377 A1 | 1/2013 |
| WO | 2013031402 A1 | 3/2013 |

* cited by examiner

FIG.4

| | ASSIGNED RESOURCE FOR INTERFERING USER | OTHER THAN ASSIGNED RESOURCE FOR INTERFERING USER |
|---|---|---|
| HIGH ORTHOGONALITY (LOW CORRELATION) | AVAILABLE FOR ASSIGNMENT (USING IRC) | AVAILABLE FOR ASSIGNMENT |
| LOW ORTHOGONALITY (HIGH CORRELATION) | UNAVAILABLE FOR ASSIGNMENT | AVAILABLE FOR ASSIGNMENT |

FIG.5

| CHANNEL ORTHOGO-NALITY WITH INTERFERING USER #1 | CHANNEL ORTHOGO-NALITY WITH INTERFERING USER #2 | ASSIGNED RESOURCE FOR INTERFERING USER #1 | ASSIGNED RESOURCE FOR INTERFERING USER #2 | OTHER RESOURCES |
|---|---|---|---|---|
| HIGH | HIGH | AVAILABLE FOR ASSIGNMENT (USING IRC) | AVAILABLE FOR ASSIGNMENT (USING IRC) | AVAILABLE FOR ASSIGNMENT |
| HIGH | LOW | AVAILABLE FOR ASSIGNMENT (USING IRC) | UNAVAILABLE FOR ASSIGNMENT | AVAILABLE FOR ASSIGNMENT |
| LOW | HIGH | UNAVAILABLE FOR ASSIGNMENT | AVAILABLE FOR ASSIGNMENT (USING IRC) | AVAILABLE FOR ASSIGNMENT |
| LOW | LOW | UNAVAILABLE FOR ASSIGNMENT | UNAVAILABLE FOR ASSIGNMENT | AVAILABLE FOR ASSIGNMENT |

BASE STATION AND SCHEDULING METHOD

CROSS-REFERENCE TO RELATED APPLICATION

This application is a continuation application of International Application No. PCT/JP2013/072896, filed on Aug. 27, 2013 and designating the U.S., the entire contents of which are incorporated herein by reference.

FIELD

The embodiments discussed herein are related to a base station and a scheduling method.

BACKGROUND

In the past, various measures have been taken in order to increase a transmission capacity (hereinafter, also referred to as "system capacity") in a communication system. For example, in a third generation partnership project long term evolution (3GPP LTE), a technique for increasing the system capacity using a "small cell" in addition to a "macro cell" has been discussed. Here, a "cell" is defined based on a "communication area" and a "channel frequency" of one base station. The "communication area" may be an entire area that a radio wave transmitted from a base station can reach with a predetermined power value or higher (hereinafter, also referred to as "range area"), or alternatively, may be a divided area obtained by dividing the range area (so-called sector). On the other hand, the "channel frequency" is one unit of frequency used by a base station for communication and defined based on a center frequency and a bandwidth. In addition, the channel frequency is part of an "operating band" assigned to an entire system. Meanwhile, the "macro cell" is a cell of a base station capable of transmitting with a higher transmission power (macro base station), that is, a base station having a larger range area. Compared to this, the "small cell" is a cell of a base station that transmits with a lower transmission power (i.e., a small-cell base station), that is, a base station having a smaller range area. Furthermore, a network in which a plurality of base stations with different transmission power or of different types coexists, as described above, is sometimes called "heterogeneous network". Examples of the small cell include a pico cell.

Here, in the heterogeneous network, there is a case where a problem is caused by, for example, a terminal in the macro cell interfering with a terminal or a base station in the small cell. As a technique for suppressing such interference, for example, a technique called inter-cell interference coordination (ICIC) has been proposed. In the ICIC, the macro base station prepares a resource whose assignment to a terminal being connected to that macro base station is limited (that is, a "resource not to be assigned") to reduce the interference in that resource with the small-cell base station or a terminal being connected to the small-cell base station. In a 3GPP Release 8, for example, a high interference indicator (HII) serving as an X2 interface is defined. By using the HII, a resource of a terminal significantly interfering with an adjacent cell can be notified to the adjacent cell.

[Patent Document 1] Japanese Laid-open Patent Publication No. 2011-091783

[Patent Document 2] Japanese National Publication of International Patent Application No. 2012-511295

[Patent Document 3] Japanese Laid-open Patent Publication No. 2012-231217

[Patent Document 4] Japanese National Publication of International Patent Application No. 2011-515916

Incidentally, in the small cell, a resource corresponding to a resource not to be assigned in the macro cell functions as a resource to be assigned in the small cell, whereas a resource corresponding to a resource to be assigned in the macro cell functions as a resource not to be assigned in the small cell.

In other words, according to the related ICIC, part of resources in the small cell is not usable and thus the available resources in the small cell are decreased. As a result, throughput is reduced.

SUMMARY

According to an aspect of the embodiments, a base station serves as a second base station in a communication system including a first base station corresponding to a first cell and the second base station corresponding to a second cell smaller than a first area of the first cell. At least part of the second cell overlaps the first area. The base station includes: a calculation unit that, based on a first channel estimation value between a first terminal being connected to the first base station through the first cell and the second base station as well as a second channel estimation value between a second terminal being connected to the second base station through the second cell and the second base station, calculates an indicator based on a phase relationship between the first channel estimation value and the second channel estimation value; and a scheduler that, based on the calculated indicator, determines whether to include a first candidate for a resource that the first base station assigns to the first terminal in a second candidate for a resource that the second base station assigns to the second terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an exemplary reference for determining an assigned resource candidate;

FIG. 5 is a diagram illustrating an exemplary reference for determining the assigned resource candidate in a case where a plurality of interfering users is present;

DESCRIPTION OF EMBODIMENTS

Figure 1:
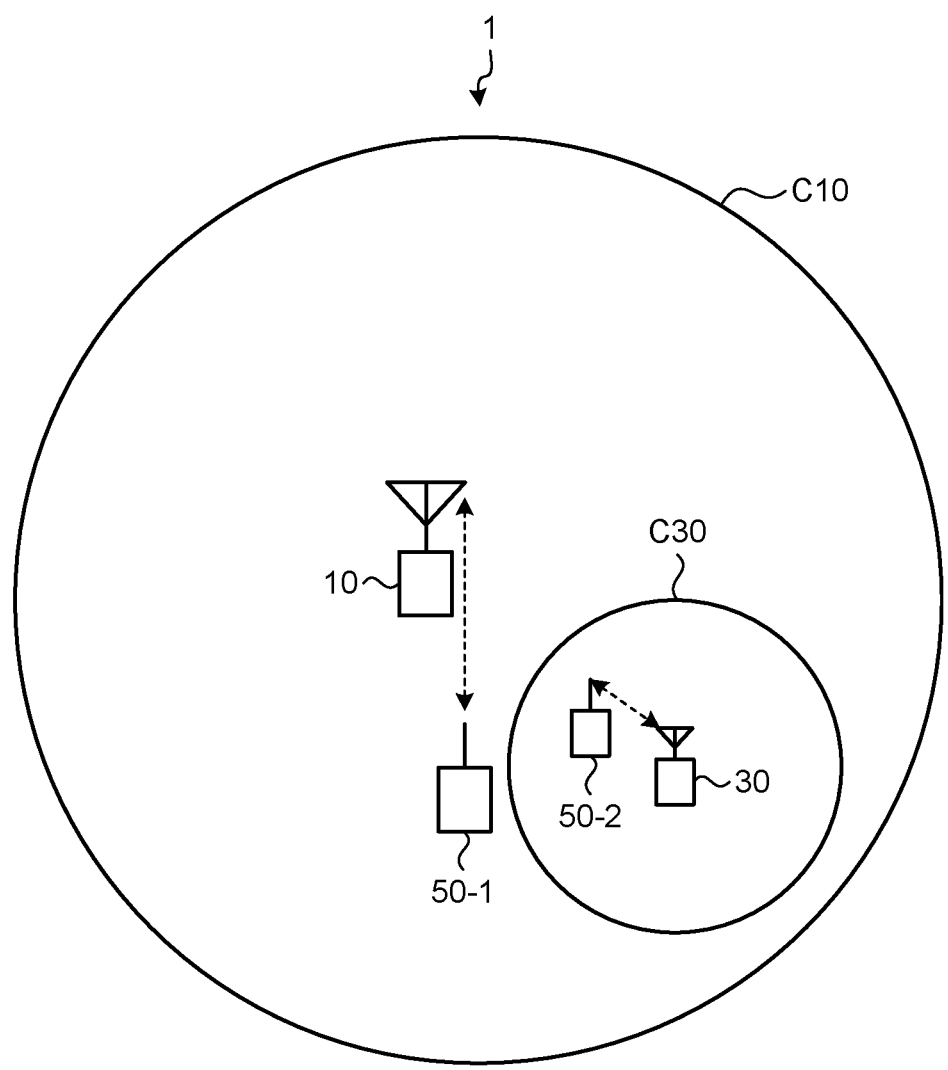
FIG. 1 is a diagram illustrating an exemplary communication system according to a first working example.

Preferred embodiments will be explained with reference to accompanying drawings. Note that the embodiments are not construed to limit the base station and the scheduling method disclosed by the present application. Configurations having the same functions are denoted by the same reference numerals in the embodiments and the duplicated descriptions thereof will be omitted.

FIRST WORKING EXAMPLE

Overview of Communication System

FIG. 1 is a diagram illustrating an exemplary communication system according to a first working example. In FIG. 1, a communication system 1 includes a base station 10, a base station 30, and terminals 50-1 and 50-2. Hereinafter, the base station 10 and the base station 30 are also referred to as "first base station" and "second base station", respectively. A cell C10 in FIG. 1 is defined by a communication area of the base station 10 (hereinafter, also referred to as "first communication area") and a first channel frequency. Meanwhile, a cell C30 is defined by a communication area of the base station 30 (hereinafter, also referred to as "second communication area") and a second channel frequency. Additionally, at least part of the second communication area overlaps the first communication area. Particularly in FIG. 1, the second communication area exists inside the first communication area. Accordingly, the first communication area is larger than the second communication area. For example, the cell C10 is a macro cell and the cell C30 is a pico cell. The base station 10 is thus a macro base station and the base station 30 is thus a pico base station. Meanwhile, the terminal 50-1 is connected to the base station 10 through the cell C10. In addition, the terminal 50-1 is a user significantly interfering with the cell C30 (that is, an interfering user). Here, based on "measurement reports" reported by the terminals 50 being present in the first communication area, the base station 10 can identify the terminal 50-1 as an interfering user. The "measurement report" includes information on reception power, in the terminal 50, of a reference signal transmitted from a neighboring cell of the terminal 50, which is detected through a cell search by the terminal 50. Meanwhile, the terminal 50-2 is connected to the base station 30 through the cell C30. In FIG. 1, the number of each of the base station 10 and the base station 30 is one and the number of the terminals 50 is two. However, the base stations and the terminals are not limited to these numbers.

Based on a channel estimation value between the base station 30 and the terminal 50-1 and a channel estimation value between the base station 30 and the terminal 50-2, the base station 30 calculates an "indicator based on phase relationship" for both of the channel estimation values. In other words, based on a channel estimation value between the base station 30 and the terminal 50-1 and a channel estimation value between the base station 30 and the terminal 50-2, the base station 30 estimates the degree of influence that the interference from the terminal 50-1 acting as an interfering user has on a reception signal of the terminal 50-2. Hereinafter, the channel estimation value between the base station 30 and the terminal 50-1 is also referred to as "first channel estimation value". Likewise, hereinafter, the channel estimation value between the base station 30 and the terminal 50-2 is also referred to as "second channel estimation value". Additionally, as the "indicator based on phase relationship" for the first channel estimation value and the second channel estimation value, "orthogonality", a "correlation value", and the like can be employed. Hereinafter, the "indicator based on phase relationship" will be described as the "orthogonality".

Based on the calculated orthogonality, the base station 30 determines whether to include a resource candidate that the base station 10 assigns to the terminal 50-1 in a resource candidate to assign to the terminal 50-2. Hereinafter, the resource candidate that the base station 10 assigns to the terminal 50-1 is also referred to as "first candidate". Likewise, a resource candidate that the base station 30 assigns to the terminal 50-2 is also referred to as "second candidate".

For example, in a case where the calculated orthogonality is equal to or higher than a threshold, the base station 30 includes the first candidate in the second candidate. On the other hand, in a case where the calculated orthogonality is lower than the threshold, the base station 30 does not include the first candidate in the second candidate.

By doing the above, in a case where the calculated orthogonality is equal to or higher than the threshold, the first candidate is included in the second candidate. Accordingly, even when the ICIC is applied to the communication system 1, a decrease in the available resources in the base station 30 can be reduced. As a result, throughput can be improved. Additionally, only in a case where the orthogonality between the first channel estimation value and the second channel estimation value is high, the assigned resource candidate for the terminal 50-2 is allowed to overlap the assigned resource candidate for the terminal 50-1. With this, the base station 30 can carry out interference rejection combining (IRC) reception when receiving a signal transmitted from the terminal 50-2 to accurately separate a signal transmitted from the terminal 50-1 from a signal transmitted from the terminal 50-2. As a result, the throughput can be improved. Compared to this, in a case where the orthogonality between the first channel estimation value and the second channel estimation value is low, the assigned resource candidate for the terminal 50-2 is not allowed to overlap the assigned resource candidate for the terminal 50-1. In other words, when it is difficult to accurately separate a signal transmitted from the terminal 50-1 from a signal transmitted from the terminal 50-2, the assigned resource candidate for the terminal 50-2 is not allowed to overlap the assigned resource candidate for the terminal 50-1. As a result, unnecessary processing by the base station 30 and the terminal 50-2 can be avoided.

Exemplary Configuration of Second Base Station

Figure 2:
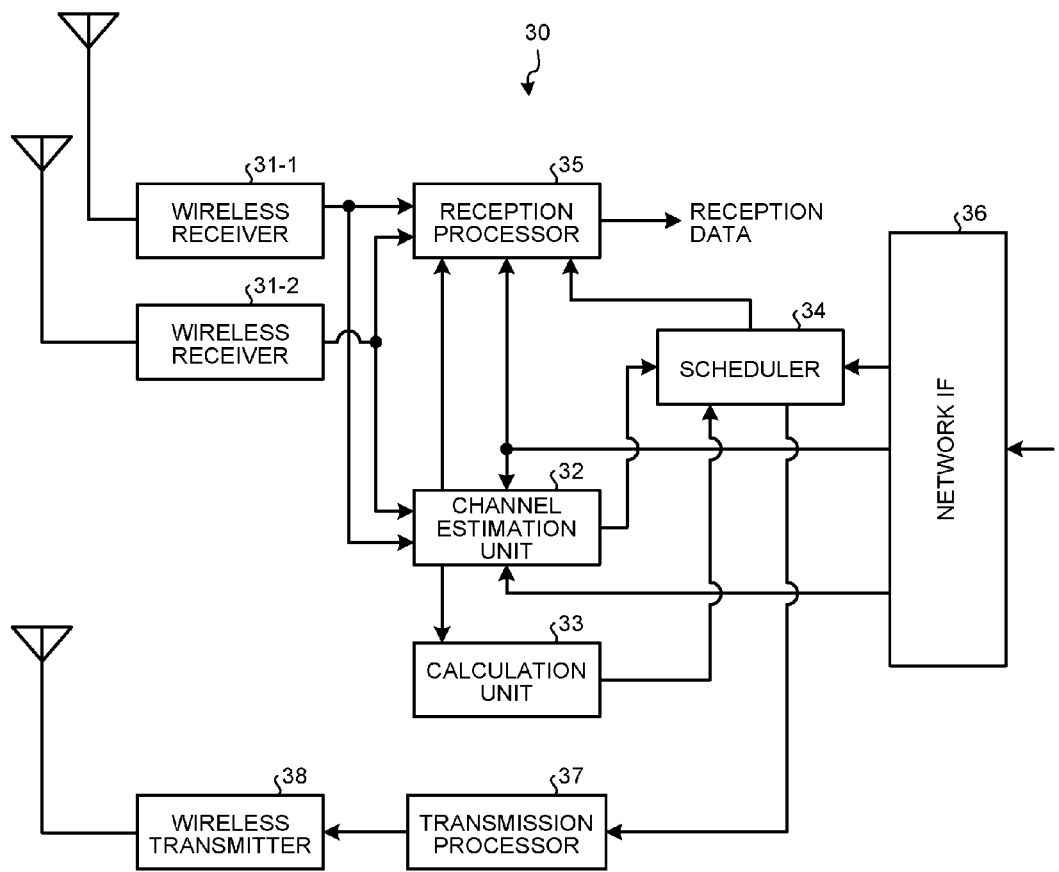
FIG. 2 is a block diagram illustrating an exemplary second base station according to the first working example.

FIG. 2 is a block diagram illustrating an exemplary second base station according to the first working example. In FIG. 2, the base station 30 includes wireless receivers 31-1 and 31-2, a channel estimation unit 32, a calculation unit 33, a scheduler 34, a reception processor 35, a network interface (IF) 36, a transmission processor 37, and a wireless transmitter 38.

The wireless receiver 31-1 carries out predetermined reception wireless processing, namely, down conversion, analog-digital conversion, and the like, on the reception signal received through a first antenna to output the reception signal subjected to the reception wireless processing to the channel estimation unit 32 and the reception processor 35. The wireless receiver 31-2 carries out predetermined reception wireless processing, namely, down conversion, analog-digital conversion, and the like, on the reception signal received through a second antenna to output the reception signal subjected to the reception wireless processing to the channel estimation unit 32 and the reception processor 35.

The channel estimation unit 32 receives "reference signal resource information" transmitted from the base station 10 through the network IF 36. The "reference signal resource information" indicates a resource by which the aforementioned interfering user transmits a first reference signal (sounding reference signal: SRS). The channel estimation unit 32 then extracts, from the reception signal received from each of the wireless receivers 31-1 and 31-2, a signal component corresponding to the resource indicated by the reference signal resource information to calculate the "first channel estimation value" based on the extracted signal components. Here, the first channel estimation value is calculated based on the first reference signal transmitted from the aforementioned terminal 50-1 acting as an interfering user.

The channel estimation unit 32 also extracts, from the reception signal received from each of the wireless receivers 31-1 and 31-2, a signal component corresponding to the first reference signal transmitted from each of the terminals 50 being connected to the base station 30 to calculate the "second channel estimation value" based on the extracted signal components. Here, the second channel estimation value is calculated based on the first reference signal transmitted from the terminal 50-2.

Subsequently, the channel estimation unit 32 outputs the calculated first channel estimation value and second channel estimation value to the calculation unit 33. Additionally, the channel estimation unit 32 outputs the calculated second channel estimation value to the scheduler 34. Here, the first channel estimation value is calculated for all resources with possibilities of being assigned to the interfering user by the base station 10 (for example, for all frequencies). Likewise, the second channel estimation value is calculated for all resources with possibilities of being assigned to the terminals 50 being connected to the base station 30 (for example, for all frequencies).

Furthermore, the channel estimation unit 32 receives "scheduling information" transmitted from the base station 10 through the network IF 36. The "scheduling information" indicates a resource for data mapping and a resource for mapping a second reference signal (demodulation reference signal: DRS) used to demodulate data, both of which are actually assigned to the aforementioned interfering user by the base station 10. The channel estimation unit 32 then extracts, from the reception signal received from each of the wireless receivers 31-1 and 31-2, a signal component corresponding to the resource for mapping the second reference signal indicated by the scheduling information to calculate a "third channel estimation value" based on the extracted signal components. Here, the third channel estimation value is calculated based on the second reference signal transmitted from the aforementioned terminal 50-1 acting as an interfering user.

In addition, the channel estimation unit 32 extracts, from the reception signal received from each of the wireless receivers 31-1 and 31-2, a signal component corresponding to the second reference signal transmitted from each of the terminals 50 being connected to the base station 30 to calculate a "fourth channel estimation value" based on the extracted signal components. Here, the fourth channel estimation value is calculated based on the second reference signal transmitted from the terminal 50-2.

Subsequently, the channel estimation unit 32 outputs the calculated third channel estimation value and fourth channel estimation value to the reception processor 35.

Based on the first channel estimation value and the second channel estimation value described above, the calculation unit 33 calculates the "orthogonality" between the first channel estimation value and the second channel estimation value. Here, the "orthogonality" can be defined as an inverse number of an inner product of two channel estimation vectors. Each of the first channel estimation value and the second channel estimation value is a channel estimation vector. Specifically, when the first channel estimation value is denoted by $h_1$ and the second channel estimation value is denoted by $h_2$, the orthogonality can be expressed by the following formula. A sign H indicates that a Hermitian transpose or a conjugate transpose is applied.

$$\text{Orthogonality} = |h_1|/h_1^H \cdot |h_2|/h_2$$

This means that the orthogonality is an inverse number of a correlation value.

Here, it can be considered that a terminal 50 with higher orthogonality is a user who is more unlikely to be interfered by the interfering user.

The scheduler 34 receives "assigned resource candidate information" transmitted from the base station 10 through the network IF 36. The "assigned resource candidate information" indicates a resource for data mapping with a possibility of being assigned to the aforementioned interfering user by the base station 10. For example, the "assigned resource candidate information" may be defined by a frame number (system frame number: SFN) and an assigned band (resource block: RB) candidate. Based on the aforementioned orthogonality, the scheduler 34 then determines whether to include the assigned resource candidate for the interfering user in the assigned resource candidate for each of the terminals 50 being connected to the base station 30. In a case where the orthogonality for one terminal 50 being connected to the base station 30 is lower than a predetermined threshold, for example, the scheduler 34 excludes the assigned resource candidate for the interfering user from the assigned resource candidate for that terminal 50. On the other hand, in a case where the orthogonality for one terminal 50 being connected to the base station 30 is equal to or higher than the predetermined threshold, the scheduler 34 includes the assigned resource candidate for the interfering user in the assigned resource candidate for that terminal 50. Subsequently, based on the second channel estimation value and the determined assigned resource candidate, the scheduler 34 assigns resources (that is, assigned resources) to the respective terminals 50 being connected to the base station 30. Thereafter, the scheduler 34 outputs information on the assigned resources (hereinafter, also referred to as "assigned resource information") to the reception processor 35 and the transmission processor 37.

Figure 3:
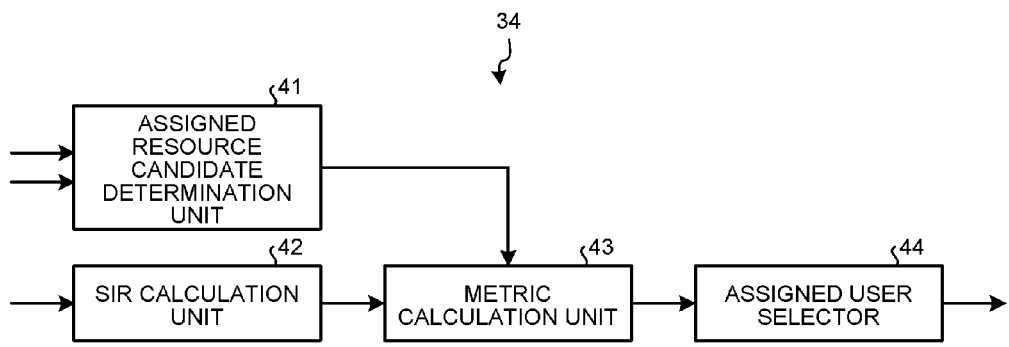
FIG. 3 is a block diagram illustrating an exemplary scheduler in the second base station according to the first working example.

FIG. 3 is a block diagram illustrating an exemplary scheduler in the second base station according to the first working example. In FIG. 3, the scheduler 34 includes an assigned resource candidate determination unit 41, a signal-to-interference ratio (SIR) calculation unit 42, a metric calculation unit 43, and an assigned user selector 44.

The "assigned resource candidate information" transmitted from the base station 10 and the orthogonality calculated in the calculation unit 33 are input into the assigned resource candidate determination unit 41. Subsequently, based on the aforementioned orthogonality, the assigned resource candidate determination unit 41 determines whether to include the assigned resource candidate for the interfering user in the assigned resource candidate for each of the terminals 50 being connected to the base station 30. For example, in a case where the orthogonality for one terminal 50 being connected to the base station 30 is lower than a predetermined threshold, the assigned resource candidate determination unit 41 excludes the assigned resource candidate for the interfering user from the assigned resource candidate for that terminal 50. On the other hand, in a case where the orthogonality for one terminal 50 being connected to the base station 30 is equal to or higher than the predetermined threshold, the assigned resource candidate determination unit 41 includes the assigned resource candidate for the interfering user in the assigned resource candidate for that terminal 50. In other words, as illustrated in FIG. 4, in a case where the orthogonality for one terminal 50 being connected to the base station 30 is high, the assigned resource candidate for the interfering user is available for assignment to that terminal 50. Compared to this, in a case where the orthogonality for one terminal 50 being connected to the base station 30 is low, the assigned resource candidate for the interfering user is unavailable for assignment to that terminal 50. Note that other resources than the assigned resource candidate for the interfering user are available for assignment to the terminals 50 regardless of the degree of the orthogonality. FIG. 4 is a diagram illustrating an exemplary reference for determining the assigned resource candidate.

For example, based on the "assigned resource candidate information", the orthogonality, and the table indicated in FIG. 4, the assigned resource candidate determination unit 41 determines a schedulable resource block group (RBG). The RBG has a plurality of resource blocks (RB) each serving as a smallest unit of resource. In addition, the RBG is a smallest unit for assignment of resource. For example, there are 25 RBs in a band of 5 MHz in LTE. When one RBG has five RBs, then five RBGs can be formed. Accordingly, resources can be assigned to five users at the maximum for one scheduling timing.

The SIR calculation unit 42, into which the aforementioned second channel estimation value is input, calculates the SIR based on this second channel estimation value. The SIR calculation unit 42 calculates the SIR for each of combinations of the terminals 50 being connected to the base station 30 and the RBGs.

The metric calculation unit 43 calculates a scheduling metric for the assigned resource candidate determined by the assigned resource candidate determination unit 41. The metric calculation unit 43 calculates the scheduling metric for each of combinations of the terminals 50 being connected to the base station 30 and the RBGs. For example, using the SIR calculated by the SIR calculation unit 42 and a table in which the SIR is associated with an expected value of throughput, the metric calculation unit 43 identifies an expected value of throughput corresponding to the SIR calculated by the SIR calculation unit 42. The metric calculation unit 43 may use the identified expected value of throughput as the scheduling metric. Alternatively, the metric calculation unit 43 may use, as the scheduling metric, a value obtained by dividing the identified expected value of throughput by an average throughput value. In this case, a value of the scheduling metric for an RBG unavailable for assignment is assumed as zero.

Based on the scheduling metric calculated by the metric calculation unit 43, the assigned user selector 44 selects a terminal 50 (that is, a user) to assign to for each of the assigned resource candidates determined by the assigned resource candidate determination unit 41. In other words, based on the scheduling metric, the assigned user selector 44 selects a user to assign each of the RBGs to. For example, the assigned user selector 44 selects a user having a largest scheduling metric for each of the RBGs. However, non-consecutive resources are not allowed to be assigned to a user in an uplink of the LTE. Therefore, in the case of the non-consecutive resources, a user having a second largest scheduling metric will be selected. As described above, the resources can be assigned to users of the respective RBGs.

In the description above, a case where the plurality of interfering users is present is not particularly discussed. However, the following processing can be carried out as an example.

EXAMPLE 1

The scheduler 34 simply uses a minimum value among the orthogonality values each corresponding to one of the plurality of interfering users. Specifically, in a case where a minimum value of the orthogonality between one terminal 50 and the respective interfering users is lower than a predetermined threshold, the scheduler 34 excludes the assigned resource candidates for all the interfering users from the assigned resource candidate for that terminal 50. In other words, when even one value of the orthogonality between one terminal 50 and the respective interfering users falls below the predetermined threshold, the scheduler 34 excludes the assigned resource candidates for all the interfering users from the assigned resource candidate for that terminal 50

EXAMPLE 2

As illustrated in FIG. 5, the scheduler 34 determines whether to include the assigned resource candidate for the interfering user for each of the interfering users. For example, in a case where the orthogonality between the first channel estimation value for an interfering user #1 and the second channel estimation value for one terminal 50 being connected to the base station 30 is high, as illustrated in FIG. 5, the assigned resource candidate for the interfering user #1 is included in the assigned resource candidate for the one terminal 50. Meanwhile, in a case where the orthogonality between the first channel estimation value for an interfering user #2 and the second channel estimation value for the one terminal 50 is low, the assigned resource candidate for the interfering user #2 is included in the assigned resource candidate for the one terminal 50. FIG. 5 is a diagram illustrating an exemplary reference for determining the assigned resource candidate in a case where the plurality of interfering users is present.

Referring back to FIG. 2, the transmission processor 37, into which the assigned resource information is input, carries out predetermined transmission processing thereon to output to the wireless transmitter 38. The predetermined transmission processing includes encoding processing and modulation processing. Additionally, in a case where a transmission signal is an OFDM signal, the predetermined transmission processing includes inverse fast Fourier transform (IFFT).

The wireless transmitter 38 carries out predetermined wireless transmission processing, namely, digital-analog conversion, up conversion, and the like, on the transmission signal subjected to the predetermined transmission processing to transmit, through an antenna, the transmission signal subjected to the wireless transmission processing.

The "scheduling information" and the "assigned resource information" described above are input into the reception processor 35. The reception processor 35 then carries out "directional reception" for a resource overlapping the resource indicated by the scheduling information among the resources indicated by the "assigned resource information". Examples of the "directional reception" include the aforementioned IRC reception. The IRC reception is carried out using a "demodulation weight vector". The "demodulation weight vector" is calculated based on the third channel estimation value and the fourth channel estimation value described above.

For example, a demodulation weight vector $W_1$ can be calculated using the following formula (1).

$$W_1^H = h_4^H (h_4 h_4^H + h_3 h_3^H + \sigma^2 I)^{-1} \quad (1)$$

Here, $h_4$ represents the aforementioned fourth channel estimation value, whereas $h_3$ represents the aforementioned third channel estimation value. Meanwhile, $\sigma^2$ is a sum of interference power and thermal noise power excluding the interfering user and the users being connected to the base station 30. In addition, I represents an identity matrix. In the formula (1), the aforementioned first channel estimation value ($h_1$) may be used instead of the third channel estimation value $h_3$. In this case, the calculation processing for the third channel estimation value carried out by the channel estimation unit 32 may be omitted.

Furthermore, the demodulation weight vector $W_1$ can be calculated using the following formula (2) where a covariance matrix $R_I$ for the interference is used, without using the third channel estimation value.

$$W_1^H = h_4^H (h_4 h_4^H + R_I)^{-1} \quad (2)$$

When the formula (2) is used, the calculation processing for the third channel estimation value carried out by the channel estimation unit 32 may be omitted. When the formula (2) is used, the acquisition of the "scheduling information" by the base station 30 may be also omitted.

Subsequently, the reception processor 35 carries out reception processing on the reception signals received from the wireless receivers 31-1 and 31-2 to output the reception data obtained through this processing to a functional unit (not illustrated) in the subsequent stage.

The network IF 36 is an interface for transmitting/receiving a signal to/from other base stations including the base station 10.

Exemplary Configuration of First Base Station

Figure 6:
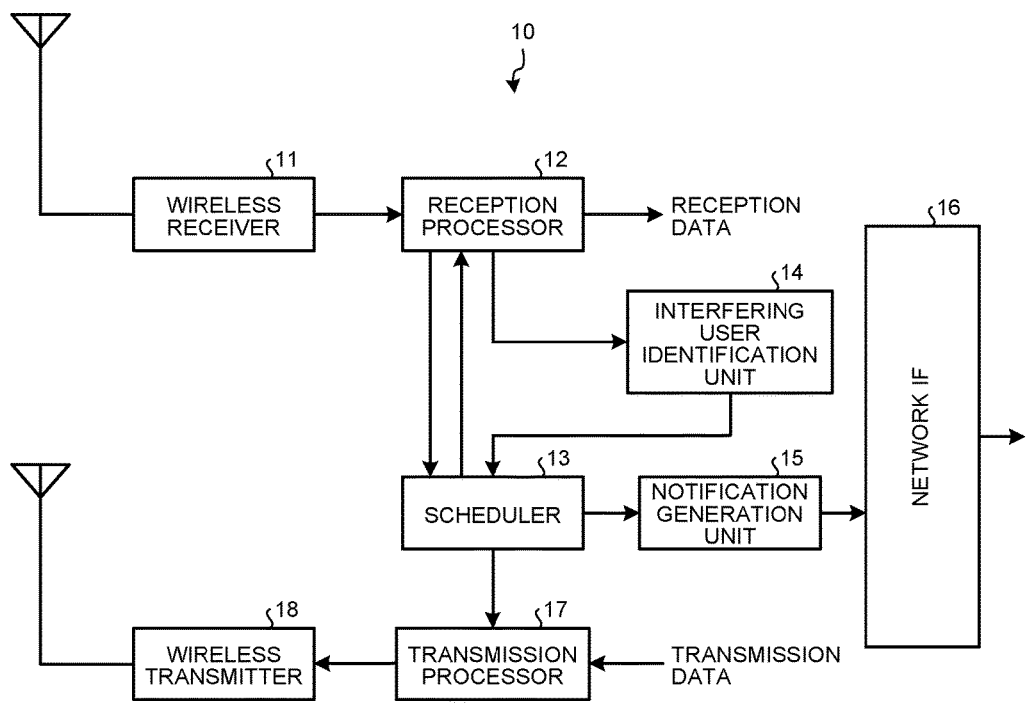
FIG. 6 is a block diagram illustrating an exemplary first base station according to the first working example.

FIG. 6 is a block diagram illustrating an exemplary first base station according to the first working example. In FIG. 6, the base station 10 includes a wireless receiver 11, a reception processor 12, a scheduler 13, an interfering user identification unit 14, a notification generation unit 15, a network IF 16, a transmission processor 17, and a wireless transmitter 18.

The wireless receiver 11 carries out predetermined reception wireless processing, namely, down conversion, analog-digital conversion, and the like, on the reception signal received through an antenna to output the reception signal subjected to the reception wireless processing to the reception processor 12.

The reception processor 12 carries out predetermined reception processing on the reception signal received from the wireless receiver 11. The predetermined reception processing includes demodulation processing and decoding processing. Additionally, in a case where the reception signal is an orthogonal frequency division multiplexing (OFDM) signal, the predetermined reception processing includes fast Fourier transform (FFT) processing. The reception processor 12 then extracts various types of signals and information from the reception signals subjected to the reception processing to output to corresponding functional units. For example, the reception processor 12 extracts the aforementioned measurement report from the reception signal to output to the interfering user identification unit 14. In addition, the reception processor 12 extracts, from the reception signal, channel quality information (channel quality indicator: CQI) reported by the terminal 50 being connected to the base station 10 to output to the scheduler 13. Based on the assigned resource information received from the scheduler 13, the reception processor 12 further extracts the reception data from the reception signal to output to a functional unit (not illustrated) in the subsequent stage.

The interfering user identification unit 14 identifies the interfering user based on the aforementioned measurement report and outputs, to the scheduler 13, information on the identified interfering user and identification information of the base station corresponding to a cell with which the interfering user interferes.

The scheduler 13 outputs, to the notification generation unit 15, the "reference signal resource information" on the interfering user identified by the interfering user identification unit 14 and the identification information of the base station corresponding to that interfering user. The scheduler 13 also outputs, to the notification generation unit 15, the "assigned resource candidate information" on the interfering user identified by the interfering user identification unit 14 and the identification information of the base station corresponding to that interfering user. In addition, the scheduler 13 assigns a resource to the terminal 50 being connected to the base station 10 based on the aforementioned channel quality information. Subsequently, the scheduler 13 outputs, to the transmission processor 17 and the reception processor 12, information on the resource assigned to the terminal 50 being connected to the base station 10. In a case where the scheduler 13 actually assigns the resource to the interfering user identified by the interfering user identification unit 14, the scheduler 13 further outputs, to the notification generation unit 15, the "scheduling information" on that interfering user and the identification information of the base station corresponding to that interfering user. While the scheduling information is notified on a subframe basis, the "assigned resource candidate information" may be notified once for the plurality of subframes.

Here, the "reference signal resource information" may include the following information, for example. Specifically, the "reference signal resource information" may include transmission comb information indicating whether a subcarrier number for which the SRS is transmitted is an even number or an odd number. The "reference signal resource information" may also include starting physical resource block assignment information indicating a smallest number among the numbers of resource blocks assigned to the SRS. The "reference signal resource information" may also include SRS periodicity indicating a transmission interval of the SRS. The "reference signal resource information" may also include SRS subframe offset information indicating a transmission start timing of the SRS. The "reference signal resource information" may also include SRS bandwidth information indicating a transmission bandwidth of the SRS. The "reference signal resource information" may also include frequency hopping bandwidth information indicating a frequency hopping band of the SRS. The "reference signal resource information" may also include cyclic shift information indicating a cyclic shift number of a system used as the SRS. The "reference signal resource information" may also include number-of-antenna ports information indicating the number of antenna ports used for transmission of the SRS.

Upon receiving the reference signal resource information from the scheduler 13, the notification generation unit 15 notifies (transmits) that reference signal resource information to the base station corresponding to the base station identification information that has been received together with the above reference signal resource information. Upon receiving the assigned resource candidate information from the scheduler 13, the notification generation unit 15 also notifies (transmits) that assigned resource candidate information to the base station corresponding to the base station identification information that has been received together with the above assigned resource candidate information. In addition, upon receiving the scheduling information from the scheduler 13, the notification generation unit 15 notifies (transmits) that scheduling information to the base station corresponding to the base station identification information that has been received together with the above scheduling information.

The network IF 16 is an interface for transmitting/receiving a signal to/from other base stations including the base station 30.

The transmission processor 17, into which transmission data and the assigned resource information are input, carries out predetermined transmission processing thereon to output to the wireless transmitter 18. The predetermined transmission processing includes encoding processing and modulation processing. Additionally, in a case where the transmission signal is an OFDM signal, the predetermined transmission processing includes the inverse fast Fourier transform (IFFT).

The wireless transmitter 18 carries out predetermined wireless transmission processing, namely, digital-analog conversion, up conversion, and the like, on the transmission signal subjected to the predetermined transmission processing to transmit, through an antenna, the transmission signal subjected to the wireless transmission processing.

Exemplary Configuration of Terminal

Figure 7:
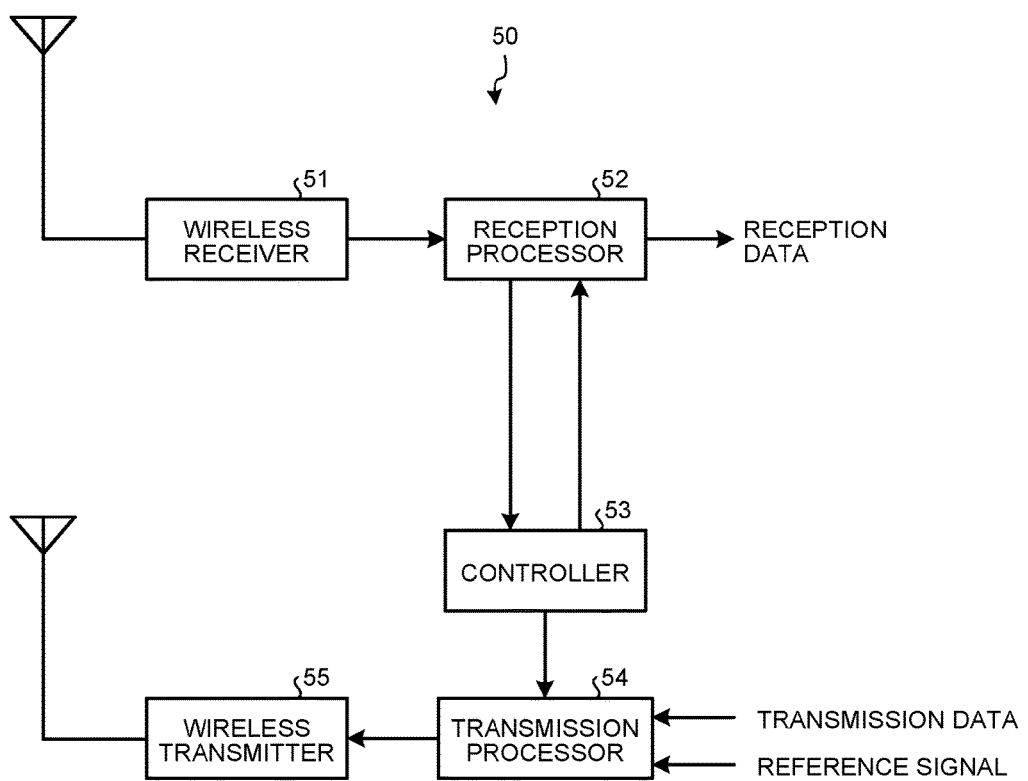
FIG. 7 is a block diagram illustrating an exemplary terminal according to the first working example.

FIG. 7 is a block diagram illustrating an exemplary terminal according to the first working example. In FIG. 7, the terminal 50 includes a wireless receiver 51, a reception processor 52, a controller 53, a transmission processor 54, and a wireless transmitter 55.

The wireless receiver 51 carries out predetermined reception wireless processing, namely, down conversion, analog-digital conversion, and the like, on the reception signal received through an antenna to output the reception signal subjected to the reception wireless processing to the reception processor 52.

The reception processor 52 carries out predetermined reception processing on the reception signal received from the wireless receiver 51. The predetermined reception processing includes demodulation processing and decoding processing. Additionally, in a case where the reception signal is an orthogonal frequency division multiplexing (OFDM) signal, the predetermined reception processing includes the fast Fourier transform (FFT) processing. The reception processor 52 then extracts various types of signals and information from the reception signals subjected to the reception processing to output to corresponding functional units. For example, the reception processor 52 extracts, from the reception signal, a control signal transmitted from the base station to which the terminal 50 is connecting, to output to the controller 53. Additionally, the reception processor 52 receives, from the controller 53, information on the assigned resource in a downlink and extracts data mapped to that assigned resource to output, as the reception data, to a functional unit (not illustrated) in the subsequent stage.

The controller 53 extracts, from the control signal received from the reception processor 52, the assigned resource information designated to the terminal 50. The controller 53 then outputs the assigned resource information of the downlink and the assigned resource information of the uplink, both of which are included in the extracted assigned resource information, to the reception processor 52 and the transmission processor 54, respectively.

The transmission processor 54, into which the transmission data and the reference signals (including the first reference signal and the second reference signal) are input, carries out predetermined transmission processing thereon to output to the wireless transmitter 55. The predetermined transmission processing includes encoding processing and modulation processing. Additionally, in a case where a transmission signal is an OFDM signal, the predetermined transmission processing includes inverse fast Fourier transform (IFFT). Here, the transmission processor 54 maps the transmission data to the resource indicated by the assigned resource information of the uplink received from the controller 53. The transmission processor 54 also maps the reference signal to a predetermined resource.

The wireless transmitter 55 carries out predetermined wireless transmission processing, namely, digital-analog conversion, up conversion, and the like, on the transmission signal subjected to the predetermined transmission processing to transmit, through an antenna, the transmission signal subjected to the wireless transmission processing.

Exemplary Operation of Communication System

Figure 8:
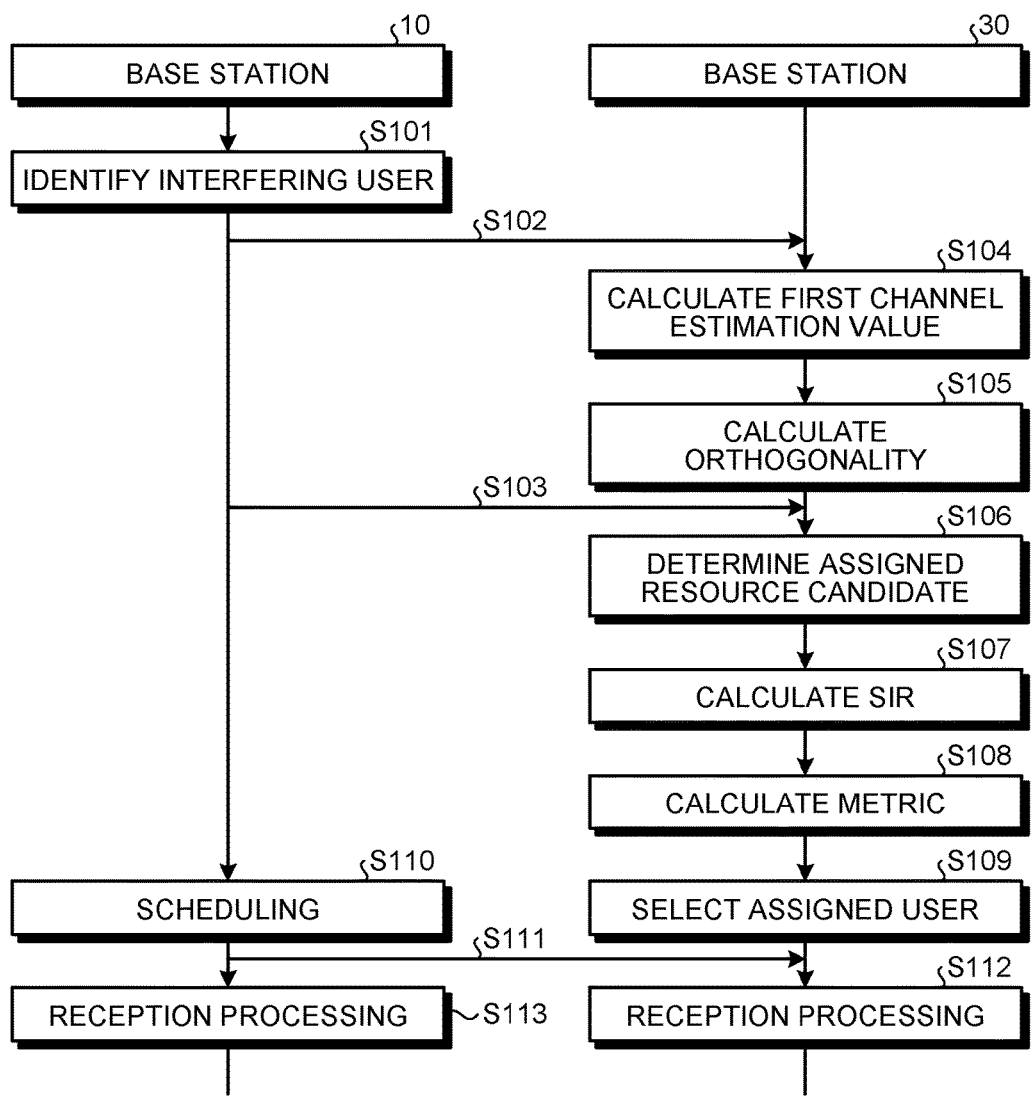
FIG. 8 is a diagram for explaining exemplary processing operation of the communication system according to the first working example.

Exemplary processing operation of the communication system 1 having the configuration described above will be described. FIG. 8 is a diagram for explaining the exemplary processing operation of the communication system according to the first working example.

In the base station 10, the interfering user identification unit 14 identifies the interfering user based on the measurement report (step S101). This interfering user (i.e., the terminal 50-1 here) interferes with the cell of the base station 30.

The notification generation unit 15 transmits the reference signal resource information to the base station 30 (step S102).

The notification generation unit 15 also transmits the assigned resource candidate information on the interfering user to the base station 30 (step S103).

In the base station 30, the channel estimation unit 32 extracts, from the reception signal received from each of the wireless receivers 31-1 and 31-2, a signal component corresponding to the resource indicated by the reference signal resource information to calculate the first channel estimation value based on the extracted signal components (step S104). Here, the second channel estimation values for the respective terminals 50 being connected to the base station 30 are also calculated.

Based on the first channel estimation value and the second channel estimation value, the calculation unit 33 calculates the orthogonality between the first channel estimation value and the second channel estimation value (step S105).

Based on the orthogonality calculated in step S105 and the assigned resource candidate information transmitted from the base station 10, the assigned resource candidate determination unit 41 determines the assigned resource candidate (step S106). For example, in a case where the orthogonality for one terminal 50 being connected to the base station 30 is lower than a predetermined threshold, the assigned resource candidate determination unit 41 excludes the assigned resource candidate for the interfering user from the assigned resource candidate for that terminal 50. On the other hand, in a case where the orthogonality for one terminal 50 being connected to the base station 30 is equal to or higher than the predetermined threshold, the assigned resource candidate determination unit 41 includes the assigned resource candidate for the interfering user in the assigned resource candidate for that terminal 50.

The SIR calculation unit 42 calculates the SIR based on the aforementioned second channel estimation value (step S107). The SIR calculation unit 42 calculates the SIR for each of combinations of the terminals 50 being connected to the base station 30 and the RBGs.

The metric calculation unit 43 calculates the scheduling metric for the assigned resource candidate determined in step S106 (step S108). The metric calculation unit 43 calculates the scheduling metric for each of combinations of the terminals 50 being connected to the base station 30 and the RBGs.

Based on the scheduling metric calculated in step S108, the assigned user selector 44 selects a terminal 50 (that is, an assigned user) to assign to for each of the assigned resource candidates determined in step S106 (step S109).

In the base station 10, the scheduler 13 carries out scheduling for the terminals 50 including the interfering user being connected to the base station 10 (step S110).

The notification generation unit 15 transmits the scheduling information on the interfering user to the base station 30 (step S111). When the formula (2) described above is used, the processing in step S111 may be omitted.

The reception processor 35 receives a signal transmitted from the terminal 50 being connected to the base station 30 and carries out the reception processing on the reception signal (step S112). For example, the reception processor 35 carries out the IRC reception for a resource overlapping the resource indicated by the scheduling information among the resources indicated by the assigned resource information.

In the base station 10, the wireless receiver 11 receives a signal transmitted from the terminal 50 being connected to the base station 10 and carries out the reception processing on the reception signal (step S113).

According to the working example described thus far, the calculation unit 33 calculates the orthogonality between the first channel estimation value and the second channel estimation value in the base station 30. The first channel estimation value is a channel estimation value between the terminal 50-1 being connected to the base station 10 and the base station 30. Meanwhile, the second channel estimation value is a channel estimation value between the terminal 50-2 being connected to the base station 30 and the base station 30. Based on the orthogonality calculated by the calculation unit 33, the scheduler 34 then determines whether to include the first candidate for a resource that the base station 10 assigns to the terminal 50-1 in the second candidate for a resource that the base station 30 assigns to the terminal 50-2. For example, in a case where the orthogonality calculated by the calculation unit 33 is equal to or higher than a threshold, the scheduler 34 includes the first candidate in the second candidate. On the other hand, in a case where the orthogonality calculated by the calculation unit 33 is lower than the threshold, the scheduler 34 does not include the first candidate in the second candidate.

With this configuration of the base station 30, in a case where the calculated orthogonality is equal to or higher than the threshold, the first candidate is included in the second candidate. Accordingly, even when the ICIC is applied to the communication system 1, a decrease in the available resources in the base station 30 can be reduced. As a result, throughput can be improved. Additionally, only in a case where the orthogonality between the first channel estimation value and the second channel estimation value is high, the assigned resource candidate for the terminal 50-2 is allowed to overlap the assigned resource candidate for the terminal 50-1. With this, the base station 30 can carry out the IRC reception when receiving a signal transmitted from the terminal 50-2 to accurately separate a signal transmitted from the terminal 50-1 from a signal transmitted from the terminal 50-2. As a result, throughput can be improved. Compared to this, in a case where the orthogonality between the first channel estimation value and the second channel estimation value is low, the assigned resource candidate for the terminal 50-2 is not allowed to overlap the assigned resource candidate for the terminal 50-1. In other words, when it is difficult to accurately separate a signal transmitted from the terminal 50-1 from a signal transmitted from the terminal 50-2, the assigned resource candidate for the terminal 50-2 is not allowed to overlap the assigned resource candidate for the terminal 50-1. As a result, unnecessary processing by the base station 30 and the terminal 50-2 can be avoided.

Additionally, in the base station 30, the network IF 36 acquires, from the base station 10, information on the resource by which the terminal 50-1 transmits the reference signal (SRS) (that is, the aforementioned reference signal resource information).

With this configuration of the base station 30, a channel estimation value between the terminal 50-1 not connected to the base station 30 and the base station 30 can be calculated.

OTHER WORKING EXAMPLES

The respective components of each section indicated in the first working example do not necessarily need to be configured as illustrated in the drawings from a physical viewpoint. In other words, specific modes of distribution and integration of respective sections are not limited to the ones illustrated in the drawings. Therefore, all or part thereof can be functionally or physically distributed or integrated in any unit depending on various types of loads, usage, and the like.

Furthermore, all or any part of various processing functions carried out in the respective units may be performed by a central processing unit (CPU) (or a microcomputer such as a micro processing unit (MPU) or a micro controller unit (MCU)). Alternatively, all or any part of various processing functions may be performed by programs analyzed and executed on a CPU (or a microcomputer such as the MPU or the MCU) or by wired logic hardware.

The base station and the terminal according to the first working example can be realized with the following hardware configuration, for example.

Figure 9:
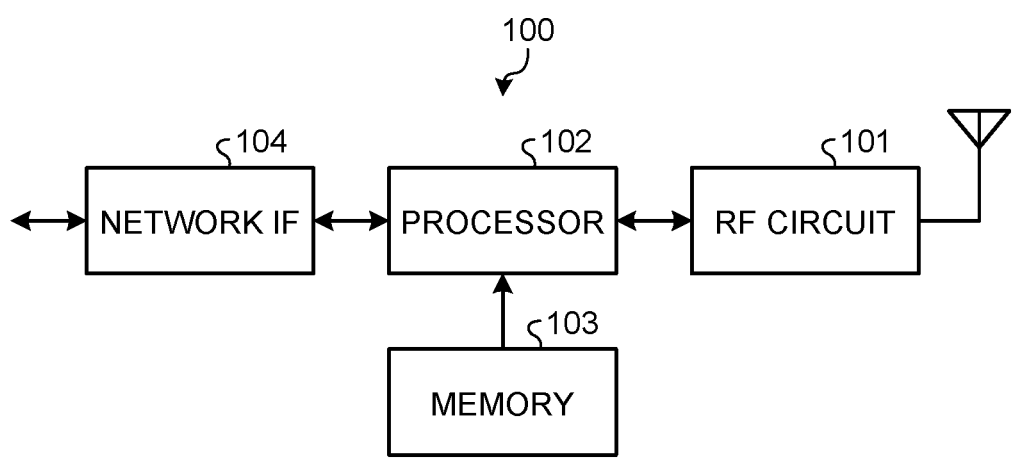
FIG. 9 is a diagram illustrating an exemplary hardware configuration of a base station.

FIG. 9 is a diagram illustrating an exemplary hardware configuration of a base station. As illustrated in FIG. 9, a base station 100 includes a radio frequency (RF) circuit 101, a processor 102, a memory 103, and a network interface (IF) 104. Examples of the processor 102 include the central processing unit (CPU), a digital signal processor (DSP), and a field programmable gate array (FPGA). Meanwhile, examples of the memory 103 include a random access memory (RAM) such as a synchronous dynamic random access memory (SDRAM), a read only memory (ROM), and a flash memory. Each of the base station 10 and the base station 30 has the hardware configuration illustrated in FIG. 9.

Various processing functions carried out in the base station according to the first working example may be realized by a processor included in an amplifying apparatus, which executes programs stored in various types of memories such as a non-volatile storage medium. Specifically, a program corresponding to the processing carried out by each of the reception processor 12, the scheduler 13, the interfering user identification unit 14, the notification generation unit 15, and the transmission processor 17 may be recorded in the memory 103 and the respective programs may be executed by the processor 102. In addition, a program corresponding to the processing carried out by each of the channel estimation unit 32, the calculation unit 33, the scheduler 34, the reception processor 35, and the transmission processor 37 may be recorded in the memory 103 and the respective programs may be executed by the processor 102. Furthermore, the wireless receiver 11 and the wireless transmitter 18 are realized by the RF circuit 101. The wireless receivers 31-1 and 31-2 and the wireless transmitter 38 are also realized by the RF circuit 101.

Here, the base station 100 has been described as one integrated apparatus. However, the base station 100 is not limited thereto. For example, the base station 100 may be separated into two different apparatuses, namely, a wireless apparatus and a controlling apparatus. In this case, for example, the RF circuit 101 is disposed in the wireless apparatus, whereas the processor 102, the memory 103, and the network IF 104 are disposed in the controlling apparatus.

Figure 10:
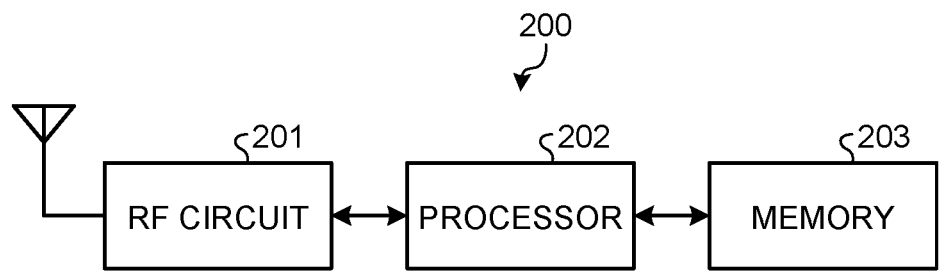
FIG. 10 is a diagram illustrating an exemplary hardware configuration of a terminal.

FIG. 10 is a diagram illustrating an exemplary hardware configuration of a terminal. As illustrated in FIG. 10, a terminal 200 includes an RF circuit 201, a processor 202, and a memory 203.

Examples of the processor 202 include the CPU, the DSP and the FPGA. Meanwhile, examples of the memory 203 include a RAM such as the SDRAM, the ROM, and the flash memory.

Various processing functions carried out in the terminal according to the first working example may be realized by a processor included in an amplifying apparatus, which executes programs stored in various types of memories such as the non-volatile storage medium. Specifically, a program corresponding to the processing carried out by each of the reception processor 52, the controller 53, and the transmission processor 54 may be recorded in the memory 203 and the respective programs may be executed by the processor 202. In addition, the processing carried out by each of the reception processor 52, the controller 53, and the transmission processor 54 may be allocated to each of a plurality of processors such as a base band CPU and an application CPU to be carried out thereby. Furthermore, the wireless receiver 51 and the wireless transmitter 55 are realized by the RF circuit 201.

An aspect of the disclosure can improve the throughput.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station that serves as a second base station in a communication system including a first base station corresponding to a first cell and the second base station corresponding to a second cell smaller than a first area of the first cell, at least part of the second cell overlapping the first area, the base station comprising:
   a calculation unit that, based on a first channel estimation value between a first terminal being connected to the first base station through the first cell and the second base station as well as a second channel estimation value between a second terminal being connected to the second base station through the second cell and the second base station, calculates an indicator based on a phase relationship between the first channel estimation value and the second channel estimation value; and
   a scheduler that, based on the calculated indicator, determines whether to include a first candidate for a resource that the first base station assigns to the first terminal in a second candidate for a resource that the second base station assigns to the second terminal.

2. The base station according to claim 1, wherein
the calculation unit calculates, as the indicator, orthogonality between the first channel estimation value and the second channel estimation value, and
in a case where the calculated orthogonality is equal to or higher than a threshold, the scheduler includes the first candidate in the second candidate, whereas in a case where the calculated orthogonality is lower than the threshold, the scheduler does not include the first candidate in the second candidate.

3. The base station according to claim 1, further including:
an acquisition unit that acquires, from the first base station, information on a resource by which the first terminal transmits a reference signal; and
a channel estimation unit that calculates the first channel estimation value based on the reference signal transmitted from the first terminal.

4. The base station according to claim 1, further including:
an acquisition unit that acquires information on a first assigned resource that the first base station assigns to the first terminal among the first candidates; and
a receiver that carries out directional reception of a signal transmitted from the second terminal in a case where the scheduler assigns a second assigned resource same as the first assigned resource to the second terminal.

5. The base station according to claim 1, further including a receiver that carries out directional reception of a signal transmitted from the second terminal using a covariance matrix for interference when carrying out reception processing for the first candidate.

6. A scheduling method in a second base station in a communication system including a first base station corresponding to a first cell and the second base station corresponding to a second cell smaller than a first area of the first cell, at least part of the second cell overlapping the first area, the scheduling method comprising:
calculating, based on a first channel estimation value between a first terminal being connected to the first base station through the first cell and the second base station as well as a second channel estimation value between a second terminal being connected to the second base station through the second cell and the second base station, an indicator based on a phase relationship between the first channel estimation value and the second channel estimation value; and determining, based on the calculated indicator, whether to include a first candidate for a resource that the first base station assigns to the first terminal in a second candidate for a resource that the second base station assigns to the second terminal.

* * * * *